3,786,033
BIS(EXO-TRIMETHYLENENORBORNYL-(2)-EXO) HYDROGEN-PHOSPHATE
Yoshiaki Inamoto, Wakayama, and Takeji Kadono, Kainan, Japan, assignors to Kao Soap Co., Ltd., Tokyo, Japan
No Drawing. Filed June 23, 1971, Ser. No. 156,113
Claims priority, application Japan, June 24, 1970, 45/54,976
Int. Cl. C07f 9/08
U.S. Cl. 260—958           1 Claim

ABSTRACT OF THE DISCLOSURE

A compound of the formula

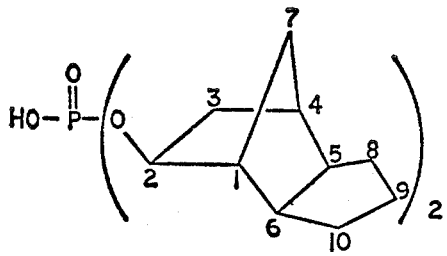

is prepared by esterifying 2-exo-hydroxy-exo-trimethylenenorbornane with phosphoric acid. The compound is useful as an additive for synthetic lubricating oils and hydraulic oils.

BACKGROUND OF THE INVENTION

Field of the invention

This invention relates to a process for preparing a secondary phosphate having two tricyclic alkyl groups. More particularly, the present invention relates to a process for preparing a secondary phosphate of 2-exo-hydroxy-exo-trimethylenenorbornane, which secondary phosphate has the formula:

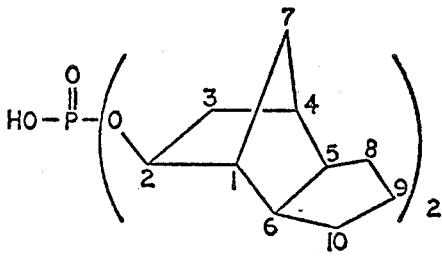

(I)

DETAILED DESCRIPTION

Bis(exo - trimethylenenorbornyl - (2)-exo) hydrogen phosphate of the structure shown in the above Formula I obtained according to the process of the present invention is a novel substance. The compound is used as an additive for synthetic lubricating oils, hydraulic oils, etc., and it exhibits specific properties that have never been obtained before and that are superior to those of known phosphates having straight chain aliphatic residues or aromatic residues in such properties as viscosity index, friction coefficient, antioxidant properties, etc. Thus, the said compound is quite useful.

The process of the present invention is characterized by the direct esterification of an alcohol corresponding to the alkyl residue of Formula I, i.e., 2-exo-hydroxy-exo-trimethylenenorbornane with phosphoric acid with the elimination of water. In the reaction, the use of esterification catalysts such as sulfuric acid, sulfonic acid or metals is not necesary at all and the final product with the Formula I can be obtained in a high yield by reacting only the above compounds, because phosphoric acid, intermediate acid phosphates or the final product per se serve as the catalyst by supplying protons.

It has been well established that by heating an aliphatic hydroxyl-containing compound with phosphoric acid, an olefin is obtained as the main product. Some primary or secondary esters are formed by partial esterification of phosphoric acid but in a small yield and in the form of a complex mixture which is difficult to separate into definite single products. Therefore, the direct esterification of aliphatic alcohols with phosphoric acid is of no practical value for the synthesis of aliphatic phosphates. We have found, however, that, unlike other aliphatic alcohols, 2-exo-hydroxy-exo-trimethylenenorbornane does form phosphates by direct condensation with phosphoric acid by the elimination of water and that the esterification reaction terminates at the stage of the secondary ester with the above Formula I, no tertiary ester being formed substantially. It is surprising that 2-exo-hydroxy-exo-trimethylenenorbornane has a reactivity entirely different from that of the other aliphatic alcohols although it has the hydroxyl group of the aliphatic nature and also that the esterification reaction terminates substantially at the stage of the secondary ester. These reactivities found by the inventors are specific to the said alcohol and cannot be inferred from the general properties of aliphatic alcohols. The present invention is based on these findings. Such a specific reactivity of 2-exo-hydroxy-exo-trimethylenenorbornane is considered to be due to the fact that the the tendency of the said alcohol to give an olefin (bicyclo [2,2,1] heptene-(2) derivative) by dehydration is far smaller than that of other non-cyclic alipatic alcohols (which should give α-olefins, 1,2-disubstituted and 1,1,2-trisubstituted ethylenes). In the esterification in the presence of phosphoric acid as catalyst, the reaction temperature should be considerably higher than the temperatures used in esterification in the presence of a stronger acid such as sulfuric acid or sulfonic acid. At such a high reaction temperature, the dehydration reaction leading to the olefin formation takes place predominantly over the esterification reaction, in the case of common aliphatic alcohols. On the other hand, the dehydration reaction occurs only with difficulty in the case of 2-exo-hydroxy-exo trimethylenenorbornane because of its structure and the desired esterification reaction proceeds smoothly. However, the dehydration reaction of 2-exo-hydroxy-exo-trimethylenenorbornane does occur at a reaction temperature higher than 210° C. to yield the corresponding olefin (2,3-dihydro-exo-dicyclopentadiene) together with a small quantity of the secondary phosphate (I). This result agrees with the fact recognized by Bruson et al. [J. Am. Chem. Soc., 70, 2809 (1948)] and Schleyer, et al. [J. Am. Chem. Soc., 78, 5702 (1956)]. The termination of the esterification reaction at the stage of the secondary phosphate with the above Formula I in the process of the present invention is considered to be due to the fact that it is difficult to introduce more than two alkoxy groups around the phosphorus atom because of the bulkiness of the alcohol. The same consideration seems to be applicable for the understanding of an unpublished, new finding of the inventors that, in synthesizing a tertiary phosphate by reaction of 3 moles of a tertairy amine, the desired tertiary phosphate is formed if the tertiary amine containing the nitrogen atom with $sp^2$ hybridization, such as pyridine, is used, but that a secondary phosphate (I) is formed in a substantially quantitative yield if the tertiary amine containing $sp^3$ nitrogen atom, such as dimethylaniline, is used.

In the process of the present invention, water formed in the esterification reaction can be withdrawn from the reaction system by means of any known methods, such as distillation under reduced pressure, elimination by passing an inert gas through the reaction mixture, evaporation through a thin film or elimination by means of an azeotropic distillation. 2 - exo - hydroxy-exo-trimethylenenorbornane may be used in the equivalent (stoichiometric) amount (2 moles) or above per one mole of phosphoric acid. The phosphoric acid added to the reaction system is not necessarily in its anhydrous form. It can be used in the form of 75–85% aqueous solution which is produced industrially. The reaction temperature is limited between 100 and 210° C., preferably 130 and 180° C. At a temperature below 100° C., the velocity of the esterification reaction is too small for the reaction to be practicable, and, on the other hand, at a temperature above 210° C., formation of the olefin through the intramolecular dehydration of the alcohol as well as the formation of the ether through the intermolecular dehydration becomes remarkable.

The process of the present invention will be illustrated below by means of an example in which the term "parts" refers to parts by weight, unless otherwise stated, and melting points and boiling points are uncorrected.

EXAMPLE 1

A mixture comprising 11.5 parts of 85% phosphoric acid, 70.1 parts of 2-exo-hydroxy-exo-trimethylenenorbornane and 15 parts of mixed xylene was stirred at 165–170° C. under reflux for 8 hours, while the water formed was removed continuously by means of azeotropic distillation with xylene. All the low boiling fractions were distilled out from the reaction mixture kept below 180° C. under reduced pressure (0.4 mm. Hg) and the resulting residue is recrystallized from dioxane to obtain 27.8 parts of colorless platelets having the melting point of 148–150° C. Yield 76%.

Acid value:
    Found: 149.1.
    Calculated for $C_{20}H_{31}O_4P$ (mono-basic acid): 153.1.
Analysis:
    Found: C, 63.8; H, 8.4; P, 8.1%.
    Calculated for $C_{20}H_{31}O_4P$: C, 65.56; H, 8.53; P, 8.45%.
IR spectrum (cm.$^{-1}$, KBr tablet):
    2990(s.), 2930(shoulder), 2890(m.): $\nu$C—H(CH$_2$, CH)
    2650(m.): $\nu$O—H(O=P—OH)
    1480(m.), 1460(m.), 1380(m.): $\delta$C—H(CH$_2$, CH)
    1250(s.): $\nu$P=O(O=P—OH)
    1010(v.s.): $\nu$C—O(OP—O—alkyl)

In the infrared absorption spectrum, absorptions in $\delta$C—H region is characteristic to trimethylenenorbornane ring hydrogens and the existence of secondary phosphate is indicated.

NMR spectrum ($\tau$, CCl$_4$ solution)

$\left.\begin{array}{l}5.68\\5.81\end{array}\right\}$ (AB-type quartet, $\underline{J}$=5 Hz, 2H):

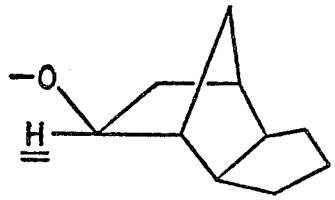

7.2—9.4 (complex multiplet, 28H):
    other H's on the ring.

In the NMR spectrum, the complex multiplet at 7.2–9.4$\tau$ is quite similar to that in the NMR spectrum of the starting alcohol and the acetyl derivative thereof. Consequently, it is apparent that the reaction product of the process of the present invention is bis(exo-trimethylenenorbornyl-(2)-exo) hydrogen phosphate having the structural Formula I.

In order to determine unequivocally the structure (I) of the secondary phosphate obtained in the present process, an authentic specimen of the Compound I was synthesized by an alternative method. This is illustrated below in Example 2.

EXAMPLE 2

(i) preparation of bis(exo-trimethylenenorbornyl-(2)-exo) hydrogen phosphite (II)

Forty-one and two tenths (41.2) parts of phosphorus trichloride was dropped over a period of 1 hour into a solution of 137 parts of 2-exo-hydroxy-exo-trimethylenenorbornane dissolved in 200 parts by volume of carbon tetrachloride, kept below 10° C., dry nitrogen gas having been bubbled through the reaction mixture throughout the reaction period. Nitrogen was bubbled for an additional two hours after the completion of the addition of phosphorus trichloride while the reaction mixture was kept below 10° C. Then dry ammonia gas was introduced into the reaction mixture until no more ammonia was absorbed (until the exhaust gas became alkaline). After the filtration of the precipitated ammonium chloride, the filtrate was evaporated to remove solvent and 2-exo-chloro-exo-trimethylenenorbornane under reduced pressure (0.5 mm. Hg; internal temperature, below 170° C.). Light yellow liquid of Compound II (104.2 parts, yield 99%) was obtained as the distillation residue. $N_D^{20}$ 1.5180.

Analysis:
    Found: C, 68.6; H, 9.0; P, 8.6%.
    Calculated for $C_{20}H_{31}O_3P$: C, 68.55; H, 8.92; P, 8.84%.
IR spectrum (cm.$^{-1}$, liquid film):
    2970 (s.), 2930 (shoulder), 2880 (m.):
        $\nu$C—H(CH$_2$, CH)
    2440 (m.): $\nu$p—H-

1480 (m.), 1450 (m.), 1370 (m.): $\delta$C—H(CH$_2$ CH)
    1265 (s.): $\nu$p=O-

980 (v.s.): $\nu$C=O-

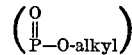

NMR spectrum ($\tau$, CCl$_4$ solution)
    3.11 (singlet, 1H): p—H
    5.45–5.90 (undissolved resonance, 2H):

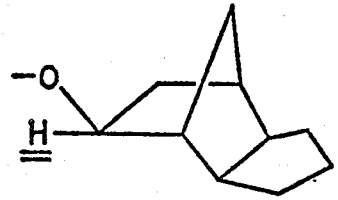

7.5–9.4 (complex multiplet, 28H):
        other hydrogens on the rings.

These properties are in agreement with the structure of the Compound II.

(ii) Preparation of bis(exo-trimethylenenorbornyl-(2)-exo) chlorophosphate (III)

To the solution of 94.5 parts of Compound II obtained in the above procedure (i) dissolved in 200 parts by volume of carbon tetrachloride, was introduced dry chlorine gas at a rate of about 2 parts by volume/sec. at a temperature below 10° C. for 3 hours. Then, nitrogen gas is introduced at room temperature for 30 minutes to expel any chlorine and hydrogen chloride gas dissolved. Upon evaporation of the solvent under reduced pressure (0.1 mm. Hg; internal temperature, below 150° C.), 100.2 parts (yield 96%) of Compound III were obtained as the distillation residue. The product was light brown, viscous liquid. $n_D^{20}$ 1.5251.

Analysis:
Found: C, 61.8; H, 7.6; P, 7.9; Cl, 10.0%.
Calculated for $C_{20}H_{30}O_3PCl$: C, 62.41; H, 7.87; P, 8.05; Cl, 9.21%.

IR spectrum (cm.$^{-1}$, liquid film):
2990 (s.), 2920 (shoulder), 2890 (s.): $\nu$C—H(CH$_2$, CH)
1480 (m.), 1455 (m.), 1370 (m.): $\delta$C—H(CH$_2$, CH)
1290 (s.): $\nu$P=O(P=O)
1010 (v.s.): $\nu$C—O(P—O—alkyl)

These properties are in agreement with the structure of the compound III.

(iiii) Preparation of bis(exo-trimethylenenorbornyl-(2)-exo) hydrogen phosphate (I)

A mixture comprising 85 parts of Compound III obtained above, 200 parts by volume of dioxane and 36 parts of water was refluxed with stirring for 2.5 hours. The reaction mixture was allowed to cool and was neutralized to pH 3 by the addition of 10% aqueous sodium hydroxide solution. The solution was evaporated to dryness on a water bath under reduced pressure. The resulting residue was extracted with dioxane three times. Dioxane was removed from the solution under reduced pressure to give 78.8 parts (yield 97%) of the crude Compound I. After recrystallization from dioxane, the pure product melting at 148–150° C. was obtained. The pure product (I) exhibited no melting point depression on admixture with the Compound I obtained in Example 1, and IR and NMR spectra of the products obtained in the two different routes agreed completely.

Acid value:
Found: 151.8.
Calculated for $C_{20}H_{31}O_4P$ (monobasic acid): 153.1.
Analysis:
Found: C, 65.2; H, 8.4; P, 8.3%.
Calculated for $C_{20}H_{31}O_4P$: C, 65.56; H, 8.53; P, 8.45%.

The embodiments of the invention in which an exclusive property or privilege is claimed are defined as follows:

1. A compound of the formula

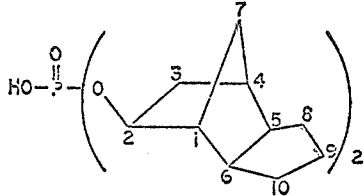

References Cited
UNITED STATES PATENTS
3,639,533  2/1972  De Pierri _____ 260—978 X
3,644,603  2/1972  Laakso _____ 260—978

FOREIGN PATENTS
178,819  7/1964  U.S.S.R. _____ 260—978

LEWIS GOTTS, Primary Examiner
R. L. RAYMOND, Assistant Examiner

U.S. Cl. X.R.
260—978; 252—49.8